No. 888,266. PATENTED MAY 19, 1908.
E. SACHS.
RETAINER FOR BALL BEARINGS.
APPLICATION FILED APR. 17, 1907.
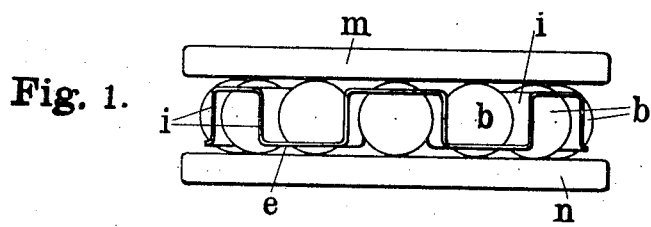
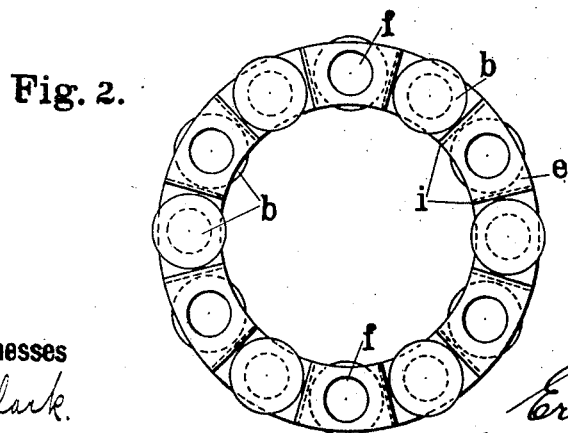
Witnesses
M. A. Clark.
Edward R. Stitman
Inventor
Ernst Sachs
By Julian (his attys)

UNITED STATES PATENT OFFICE.

ERNST SACHS, OF SCHWEINFURT, GERMANY, ASSIGNOR OF ONE-HALF TO JACK L. STRAUB, OF LANCASTER, PENNSYLVANIA.

RETAINER FOR BALL-BEARINGS.

No. 888,266.  Specification of Letters Patent.  Patented May 19, 1908.

Application filed April 17, 1907. Serial No. 368,757.

*To all whom it may concern:*

Be it known that I, ERNST SACHS, a subject of the King of Bavaria, residing at No. 5 Schultes street, Schweinfurt, in Germany, have invented a new and useful Improvement in Retainers for Ball-Bearings, of which the following is a specification.

The object of this invention is to provide an improved separator for spacing the balls in ball-bearings, which will allow arranging the balls very closely together without frictional contact between adjacent balls, and which will hold itself and the series of balls in proper position in the bearing. These effects are attained by constructing the separator of a flat strip of metal in the form of an undulated ring or annulus, having openings in the crowns of its respective undulations; the said undulated ring being arranged between and with its faces confronting the bearing-surfaces on which the balls travel, the said balls being contained in the pockets provided alternately in the two sides of the undulated ring and projecting partly through said openings for contact with said bearing surfaces.

In the accompanying drawings, which form a part of this specification, the invention is represented as applied to a thrust bearing, to which type it is more particularly adapted, though not essentially restricted thereto since the invention may also be used in journal-bearings.

Figure 1 is a side view of the thrust bearing selected for illustrating the invention. Fig. 2 is a plan view of the separator or retainer with the balls inserted therein.

The letters $m$ and $n$ denote confronting bearing-members for a thrust bearing, between which are arranged antifriction balls $b$ in an annular series. The bearing-members $m$ and $n$ may consist of ball-collars such as provided for step or thrust bearings, or flat plates or rings either with plain surfaces or with annular confronting grooves or raceways for the balls.

Between the bearing-members $m$ and $n$, and associated with the balls, is the ball-retainer or separator $e$, consisting of an undulated ring or annulus made from flat sheet-metal. The construction is such that the separator-ring is arranged flatwise as distinguished from edgewise between the two bearing-members, that is, the faces instead of the edges of the ring confront the bearing-surfaces on which the balls travel. The undulated form of the ring provides recesses or pockets alternating in its opposite sides or faces, and in these pockets the balls are loosely arranged, being spaced apart by the portions $i$ of the sheet-metal strip which lie or pass between the adjacent balls throughout the series; and the undulations of the ring are respectively provided with perforations $f$ smaller than the diameters of the balls, through which perforations the balls partly project and get contact with the bearing-rings $m$ and $n$ respectively; the interstice between the two bearing-rings being of less width than the depth of the undulations of the separator-ring.

The pockets of the separator-ring may be of various forms, either curved or square, but are preferably made square as shown by bending the strip at right-angles; thereby bringing the pockets closer together than otherwise. In an arrangement as shown in the drawings, the undulated separator-ring rests with the edges of the perforations of the upper undulations upon the included balls, thus carrying the ring $e$ the required distance above the lower bearing-ring $n$. Since with this arrangement only the thin metal strip lies between adjacent balls, the lost space is very small, and hence the bearing can be filled with a comparatively large number of balls, removing however, the frictional contact of the balls with each other. If any ball should be liable to change its proper relative position in the series by approaching another ball, the pressure exerted is to the side of the strip which is merely jammed between the two balls. For this reason, any destruction or deformation of the spacer is obviated, while a certain resiliency of the annular strip facilitates the smooth running of the balls. It will be noted that the separator-ring is supported by and carried with the balls, since the latter project through the perforations in the ring, thus making it possible if desired to employ the balls between plain bearing-surfaces without the use of race-ways or grooves.

I claim as my invention and desire to secure by Letters Patent of the United States:

1. In a ball-bearing having confronting bearing-surfaces and an annular series of interposed balls running on said surfaces, a ball-separator comprising an undulated ring or annulus of flat metal arranged between and with its two faces confronting said bearing-surfaces, the undulations of said ring providing pockets alternately in its opposite faces in which the balls are confined, said undulations having perforations of smaller diameter than the balls through which the latter partly project for contact with said bearing-surfaces.

2. In a ball-bearing having confronting bearing-surfaces and an annular series of interposed balls running on said surfaces, a ball separator comprising an undulated ring or annulus of flat metal arranged between and with its two faces confronting said bearing-surfaces, the undulations of said ring being made square by bending the metal at right angles and thereby providing pockets only slightly wider than the diameters of the balls and in which the balls are confined, said undulations having perforations of smaller diameter than the balls through which the latter partly project for contact with said bearing-surfaces.

3. A ball retainer, consisting of an undulated ring of sheet metal adapted to pass between and receive the successive balls of a series alternately in its pockets and provided with perforations through which part of the balls are adapted to project.

4. In a ball-bearing having opposed bearing surfaces and an interposed annular row of balls, a ball-retainer consisting of an undulated ring of sheet-metal adapted to pass between adjacent balls and receive the successive balls alternately in the pockets of its opposite sides, said pockets having openings through which the balls are adapted to project and come in contact with the bearing-surfaces behind the respective pockets.

In testimony whereof I have set my signature to this specification in the presence of two subscribing witnesses.

ERNST SACHS. [L. S.]

Witnesses:
 H. BARDEL,
 A. LONZL.